June 23, 1970    V. W. PETERSON    3,516,717
BEARING
Filed Nov. 15, 1968

INVENTOR.
Victor W. Peterson
BY
F. J. Fodale
ATTORNEY

United States Patent Office 3,516,717
Patented June 23, 1970

3,516,717
BEARING
Victor W. Peterson, Indianapolis, Ind., assignor to General Motors Corporation, Detroit, Mich., a corporation of Delaware
Filed Nov. 15, 1968, Ser. No. 776,096
Int. Cl. F16c *13/06*
U.S. Cl. 308—189                4 Claims

ABSTRACT OF THE DISCLOSURE

A pair of opposed angular contact bearings are used to rotatably mount and axially locate the main shaft in a gas turbine engine. Disposed between the bearing outer races is a wave spring sandwiched between two locking rings. The wave spring maintains a relatively constant preload on the bearings and the locking rings are interlocked between the bearing mounting structure and the outer races to prevent their rotation during operation at high temperatures which produce differential thermal expansion. The inner race is undercut to isolate the bearing raceway area from the effects of differential thermal expansion between the shaft and the inner raceway and to increase its resilience and ability to carry a preload.

---

My invention relates generally to the mounting of bearing assemblies and more specifically to the mounting of two opposed angular contact ball bearings in a gas turbine engine to rotatably support and axially locate the main shaft.

Due to its high operational speeds and high operating temperature, the application of bearings to a gas turbine engine is challenging. These environmental factors affect the bearings themselves in introducing radial play which cannot be tolerated at high speeds. In addition, the supporting structure for the bearing is generally made of a lightweight material such as aluminum which experiences a different expansion rate than that of the steel alloy bearing races so that the bearing tends to creep in its mounting structure and prematurely fail the mount.

While the use of preloaded bearings and heavy press fits may appear to be an easy solution, it generally is not because the preload and the press fits change markedly as the engine is subjected to high temperatures and speeds.

Accordingly, in one of its broadest aspects, it is the object of my invention to provide a bearing structure for rotatably mounting the main shaft of a gas turbine engine in which a relatively constant preload is maintained on the bearings throughout the temperature and speed regime of the engine.

In another broad aspect of my invention, it is generally the object to provide a bearing structure in which the races do not creep throughout the temperature and speed regime of the engine.

Another object of my invention is to provide a bearing structure wherein the bearings are specifically designed to accept a preload, to maintain a relatively constant preload, and has races which do not creep throughout the temperature and speed regime of the engine.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
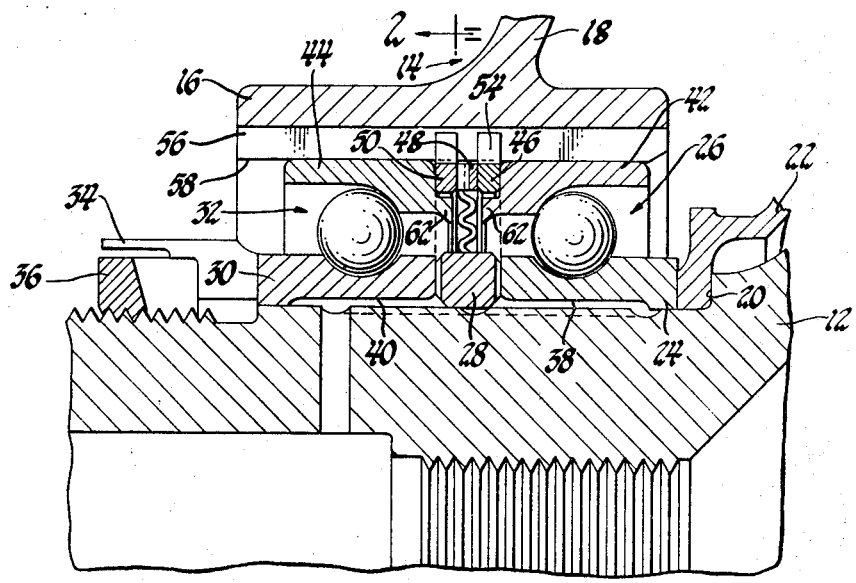
FIG. 1 is a cross section taken through a portion of a gas turbine engine showing the main shaft rotatably mounted and axially located with respect to a supporting structure in the gas turbine engine.

Referring now to the drawings and more specifically to FIG. 1, the gas turbine main shaft is shown at 12 with the supporting structure for the shaft and its bearing indicated at 14. This supporting structure comprises an annular housing 16 suspended by webs 18 from the gas turbine casing, not shown.

Returning to the shaft 12, its right-hand end is stepped to provide a shoulder 20 against which is mounted a rotatable member 22 of the gas turbine engine. Mounted on shaft 12 to the left of this member 22 are a pair of angular contact ball bearings 26 and 32. An annular spacer element 28 is located between the inner race 24 of the bearing 26 and the inner race 30 of the bearing 32. A clamping member 34 abuts the left-hand face of the inner race 30 and cooperates with a lock nut 36 threaded on the left portion of the main shaft 12 to axially locate the inner races 24 and 30 and the spacer 28.

The inner races 24 and 30 are undercut at 38 and 40, respectively, leaving only a small portion of the inner race which is actually in contact with the main shaft 12. The undercut which is in the area of the deep-groove type raceways provides two desirable functions. First, resilience is added to the inner race and consequently, the bearing may accept a higher initial preload. Secondly, since the actual contact between the shaft is relatively small and out of the raceway area, any stresses produced by differential thermal expansion between the shaft 12 and the inner races is minimized and isolated from the raceways and consequently, the balls.

Figure 3:
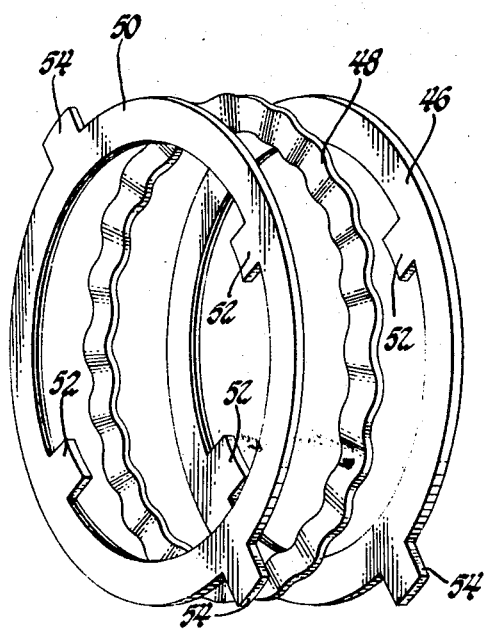
FIG. 3 is a exploded perspective view showing the relationship of the two locking rings and interjacent wave spring shown in FIG. 1.

The outer races 42 and 44 have a single thrust shoulder inboard of their respective balls so that each of the angular contact bearings 26 and 32 can carry an axial component of force in an opposite direction away from the other bearing. Each of the outer races has an annular extension 62 on its thrust shoulder which is radially spaced from the housing bore 58. Disposed between the bearing outer races 42 and 44 are a first locking ring 46, a wave spring 48, and a second locking ring 50 with each locking ring being radially disposed between the housing bore and the annular extension 62 on its respective bearing. Each of the locking rings 46 and 50 have two diametrically opposed inwardly extending tabs 52 and two diametricaly opposed radially outwardly extending tabs 54 which are located approximately 90° relative to the tabs 52 as can clearly be seen in FIG. 3.

Figure 2:
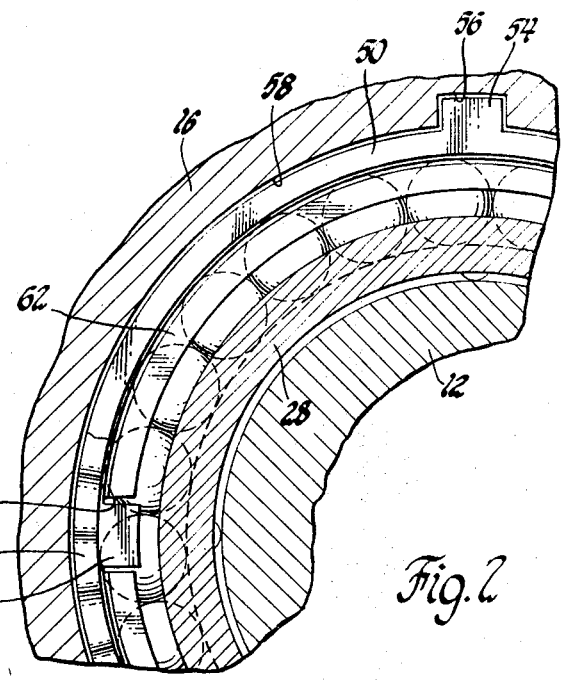
FIG. 2 is a section taken along the line 2—2 of FIG. 1 showing the frontal view of a locking ring and its relationship to one of the bearing outer races and its environmental supporting structure.

Returning to FIG. 1, the housing 16 has two diametrically opposed axial grooves 56 which open into its internal bore 58 and are adapted to receive the tabs 54 of the two locking rings. Since the cooperation of each of the locking rings 46 and 50 with the bearing outer races 42 and 44, respectively, is identical, a description of the locking ring 50 and its cooperation with the outer race 40 need only be given. FIG. 2 shows the tab 52 of the locking ring 50 received in a slot 60 in the extension 62 of the outer race 44. Thus the locking ring 50 prevents the outer race 44 from creeping in the bore 52 irrespective of the fit between the bore and the outer race 44. Similarly the locking ring 46 prevents creeping of the outer race 42.

The wave spring 48 between the two locking rings exerts an axial force through the locking rings which tends to separate the outer races 42 and 44. Such an axial force exerted on an angular contact bearing produces a preload. The wave spring characteristics are such that they have a relatively low spring rate and consequently produce a relatively constant axial force and the bearing outer races with increased deflection of the spring 48.

In summary, it is to be noted that the use of two opposed angular contact bearings and a wave spring allows a reasonable preload on the bearing with the preload being maintained as the temperature increases by the wave spring so that the preload is relatively constant throughout the temperature regime of the engine. The change in fit between the outer races and the mounting bore is compensated for by the locking rings which prevent creep regardless of this fit. The stresses produced by differential thermal expansion of the shaft and the inner races and their high speed is isolated from the bearing raceway and balls and their effect on preload is minimized.

Thus it can be seen that I have provided a bearing structure very suitable for mounting a high speed shaft in relatively light material of relatively high thermal expansion such as is the case in a gas turbine engine.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

I claim:
1. A bearing structure comprising,
a support having a bore with axial groove means opening into said bore,
a shaft disposed in said bore,
a pair of angular contact ball bearings having their inner races secured to said shaft both axially and circumferentially, each of said inner races having a thrust shoulder on the outboard side of their respective balls, each of said bearings having an outer race mounted in said bore in axially spaced relationship, each of said outer races having a thrust shoulder inboard of their respective balls,
an axial flange extending from each said thrust shoulder on said outer races, each of said flanges being radially spaced from said bore and having slot means,
a locking ring disposed radially between each of said flanges and said bore,
tab means on each locking ring extending radially into said groove means and said slot means to angularly fit each of said outer races with respect to said support, and
spring means between said locking rings to urge said outer races away from each other to maintain a preload on said balls.

2. The bearing structure as defined in claim 1 wherein each of said inner races has its inner circumferential surface undercut in its raceway area to isolate the effects of differential thermal expansion between the shaft and the inner race from the balls, and further including a spacer element between said inner races.

3. The bearing structure as defined in claim 1 wherein said spring means is an annular wave spring having a relatively low spring rate to maintain a relatively constant preload on the bearings.

4. The bearing structure as defined in claim 2 wherein said spring means is an annular wave spring having a relatively low spring rate to maintain a relatively constant preload on the bearings.

References Cited
FOREIGN PATENTS
962,376  12/1949  France.

MARTIN P. SCHWADRON, Primary Examiner

F. SUSKO, Assistant Examiner